(12) United States Patent
Hopen et al.

(10) Patent No.: US 10,846,665 B2
(45) Date of Patent: Nov. 24, 2020

(54) MANAGEMENT OF REMOTELY STORED DATA

(71) Applicant: Switch, Inc., Seattle, WA (US)

(72) Inventors: Chris Hopen, Shoreline, WA (US);
Derek Hanson, Bothell, WA (US)

(73) Assignee: Switch, Inc., Seattle, WA (US)

( * ) Notice: Subject to any disclaimer, the term of this patent is extended or adjusted under 35 U.S.C. 154(b) by 677 days.

(21) Appl. No.: 14/949,760

(22) Filed: Nov. 23, 2015

(65) Prior Publication Data

US 2017/0148000 A1     May 25, 2017

(51) Int. Cl.
*G06Q 20/10* (2012.01)
*G07F 19/00* (2006.01)
*G06Q 20/34* (2012.01)
*G06Q 30/06* (2012.01)

(52) U.S. Cl.
CPC ......... *G06Q 20/105* (2013.01); *G06Q 20/353* (2013.01); *G06Q 20/356* (2013.01); *G06Q 30/0601* (2013.01); *G07F 19/206* (2013.01)

(58) Field of Classification Search
CPC .................................................. G06F 21/121
See application file for complete search history.

(56) References Cited

U.S. PATENT DOCUMENTS

| | | | |
|---|---|---|---|
| 7,660,779 B2 | 2/2010 | Goodman et al. | |
| 7,806,323 B2 | 10/2010 | Fomitchev | |
| 8,260,699 B2 | 9/2012 | Smith et al. | |
| 9,225,737 B2 | 12/2015 | Call et al. | |
| 2005/0257148 A1 | 11/2005 | Goodman et al. | |
| 2007/0293202 A1* | 12/2007 | Moshir | G06F 21/552 455/414.2 |
| 2008/0172598 A1 | 7/2008 | Jacobsen et al. | |
| 2012/0066286 A1* | 3/2012 | Heredia | G06Q 10/10 709/201 |

* cited by examiner

*Primary Examiner* — Calvin L Hewitt, II
*Assistant Examiner* — Zehra Raza
(74) *Attorney, Agent, or Firm* — Lee & Hayes, P.C.

(57) ABSTRACT

A service provider may assist in management of remotely stored data. The service provider may cause a user device to update remotely stored personal information, including payment information, across one or more third party electronic sites (e.g., websites, applications, and/or other remote data repositories). The service provider may build a site directory of sites that store personal data. The site directory may include information to enable update of personal information for a specific site, such as which pages to access, what data to input, what type of inputs are acceptable, and other selections and/or inputs to create, modify, update, or switch personal information maintained by a site with new or different personal information. The service provider may create a script that, when executed by an application on a user device, may cause the user device to automatically update the personal information on one or more third party sites.

15 Claims, 16 Drawing Sheets

1200

Add site

Search sites

1202

Site/Business name

1204

Choose payment option for this site

1206

| AA | Card CDE, ###-3456 Bank C | PP | Card FGH, ###-6789 Bank F |

| MC | Card DEF, ###-4567 Bank D |

| D | Card EFG, ###-5678 Bank E | | Choose later |

User name

1208  Joe@abc.com

Password

1210  ************

Password Strength

Notes

☐ Enable auto-login for this site
1212
☐ Require master password for access
1214

[Save Changes] [Cancel] [Delete]
   1216        1218      1220

FIG. 12

MANAGEMENT OF REMOTELY STORED DATA

BACKGROUND

The proliferation of computing systems and the Internet has resulted in massive amounts of data stored in many different remote locations. Once data, such as personal data, is made available on the Internet, it may be difficult to track that data and update the data if the data is not well managed and is stored across many different third party sites. For example, a user may provide address data to multiple different sites, such as electronic commerce sites, social network sites, and other sites. When the user moves to a new house or apartment, the user may find it difficult, time consuming, and impractical to proactively update his or her address data at all of these sites, which results in continued existence or propagation of inaccurate or expired data, such as an out-of-date address of the user being associated with the user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 12 shows an illustrative UI that includes a site management interface to enable adding updating remote data associated with the site.

DETAILED DESCRIPTION

Figure 1:
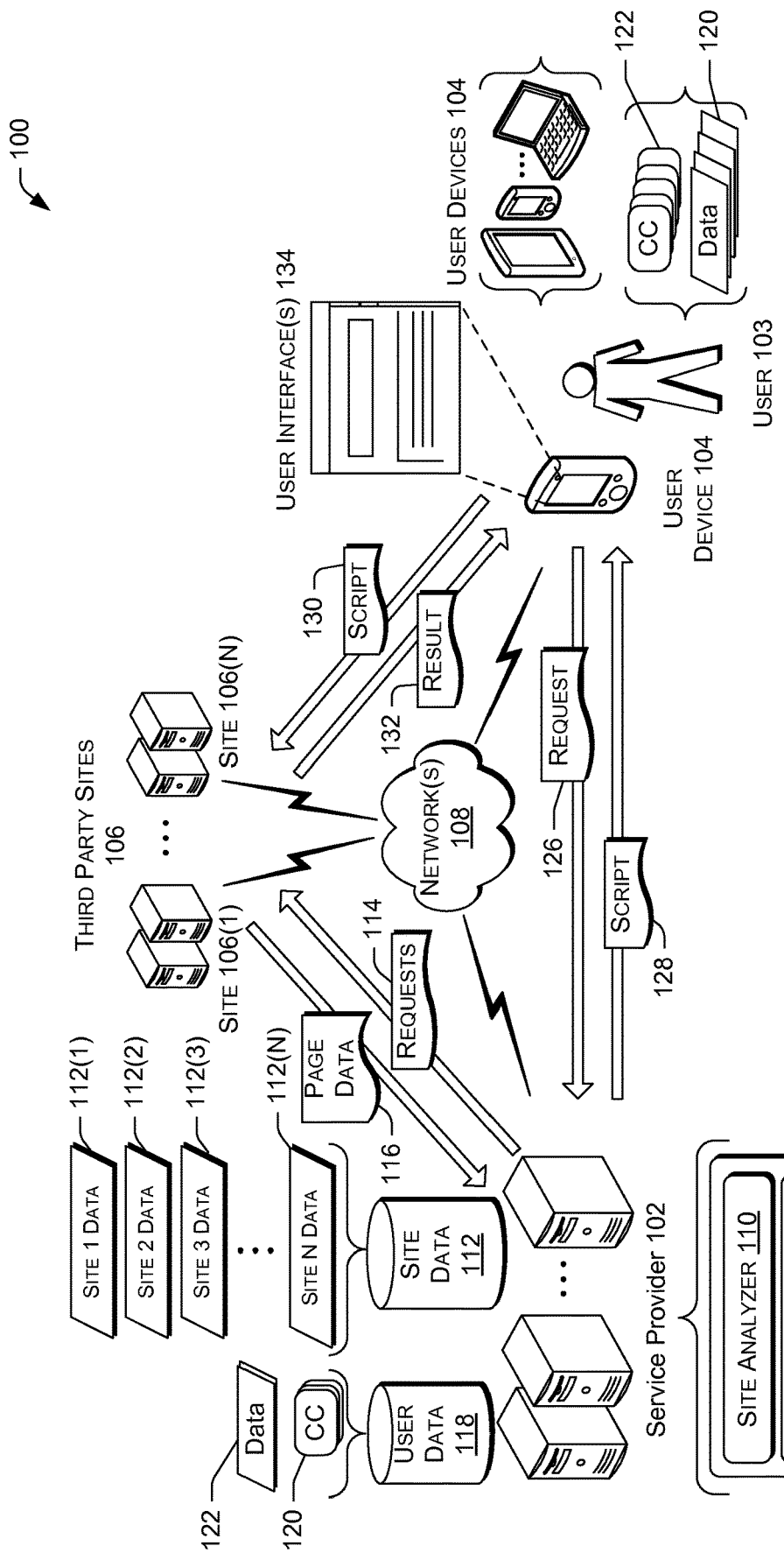
FIG. 1 is a schematic diagram of an illustrative computing environment that includes a service provider that assists a user device in managing remotely stored data located at one or more sites.

This disclosure is generally directed to management of remotely stored data. In some embodiments, a service provide may assist a user in updating remotely stored personal information, including payment information, across one or more third party electronic sites (e.g., websites, applications, and/or other remote data repositories). The service provider may build a site directory of sites that store personal data. The site directory may include information to enable update of personal information for a specific site, such as which pages to access, what data to input, what type of inputs are acceptable, and other selections and/or inputs to create, modify, update, or switch personal information maintained by a site with new or different personal information. The personal information may include payment information (e.g., credit card numbers, bank account numbers, and/or other payment information), address information, contact information (e.g., emails, phone numbers, and/or other communication data), and/or other personal information.

The service provider may create a script that, when executed by an application on a user device, may cause the user device to automatically update the personal information on one or more third party sites. By creating a script for the user device, the script may better mimic normal user input while leveraging user data stored on the user device (e.g., cookies, saved usernames/passwords, etc.). The service provider may perform rigorous testing of the script prior to deployment of the script to the user device. In various embodiments, the script may be robust to accommodate for different versions of sites operated by a third party or different presentations of the site, such as interaction with a mobile version of a site, a specific language of the site (e.g., German version versus English version, etc.), different browser settings, and so forth. Once the script is successfully tested, it may be deployed to user device, possibly in response to requests from user devices to use the script.

The service provider may occasionally or continually update site information in response to detected changes to sites. For example the service provider may actively analyze or crawl sites to determine changes to the sites. The service provider may also collect error reports from user devices to identify changes to sites. However, some errors may result from interruptions in connectivity of a user device or other temporary faults, and may not be associated with changes to a site. The service provider may distinguish between temporary errors, which may be remedied by retrying to execute the script at a later time, and errors resulting from changes to a site. In the latter situation, the service provider may create a new script to facilitate interaction with a newest version of the site.

In some embodiments, the script may be used to switch or update payment information, such as credit card information or other bank information. For example, a user may decide to update a default payment instrument, such as a credit card, across one or more remotely stored accounts that are maintained by third party sites (e.g., electronic commerce sites, bill pay services, etc.). The update may change information associated with the card (e.g., a new expiration data, card number, etc.), or the update may replace a first payment instrument with a second, different payment instrument. For example, the user may desire to use a new credit card for some or all of his or her online accounts, such as favorite electronic commerce sites that store payment information for the user.

Providers and/or servicers of the payment instruments may greatly benefit by having their payment instruments quickly updated across multiple sites, since this may increase use of those payment instruments on the sites. For example, when a user loses a credit card, reports fraudulent activity, or otherwise cancels the credit card, it may take multiple days or weeks to receive a new credit card and then update sites that store this card as a default payment instrument. During this time, the user may not make purchases using the card since the card is unavailable for use (e.g., has not arrived yet and/or been inputted to sites). However, using the techniques herein, information for a replacement credit card may be updated at sites as soon as the information is available from the credit card provider or servicer, which may be electronically provided to the user for use via the techniques provided here, possibly before receipt of a new physical card. Thus, banks and other services providers may greatly benefit by enabling updates of payment information across sites to maintain use of a payment instrument during or after issuance of a new payment instrument.

The user device may include an application that presents one or more user interfaces (UIs) to facilitate interaction with the scripts and with one or more sites. UIs may enable the user to selectively determine which sites are associated with specific types of data, such as payment instruments, addresses, communication addresses (e.g., phone numbers, emails, etc.), and so forth. The UIs may enable the user to manage these data and selectively update the data by execution of scripts obtained by the service provider.

The techniques and systems described herein may be implemented in a number of ways. Example implementations are provided below with reference to the following figures.

FIG. 1 is a schematic diagram of an illustrative computing environment 100 that includes a service provider 102 that assists a user 103 associated with a user device 104 in managing remotely stored data located at one or more third party sites 106 ("sites"). The service provider 102 may access the sites 106 and the user device 104 via one or more network(s) 108, which may include wired or wireless networks used to access the Internet and/or other local or wide networks. The user devices may include mobile telephones, notebook computers, tablets, desktop computers, wearable devices and/or other devices used to interact with the sites 106.

The service provider 102 may include a site analyzer 110, which may include instructions to cause inspection and analysis of the sites 106. The site analyzer 110 may collect site data 112, such as site data 112(1)-112(N), which may include data for each site that is analyzed. To collect the site data 112, the site analyzer 110 may send requests 114 to sites and receive page data 116 in response to the requests 114. The site analyzer 110 may inspect the page data 116 to determine inputs associated with different portions of a site (e.g., pages, tabs, etc.) and functions of those inputs. For example, a site may have multiple fields that enable input of a username. Some of these fields may be associated with a login while others may be used to update a user name, retrieve a password, and/or perform another action. Thus, the site analyzer 110 may capture and analyze information provided by the site and/or other associated information (e.g., external references/links, and/or other associated data) to determine an intent or function of a data input field. The term input field is used to represent any type of input field including selectors (e.g., drop down lists, radial buttons, etc.), text input, biometric input, and/or other types of input data.

In some embodiments, the site analyzer 110 may use credentials to access privileged locations within a site, such as user data fields that may not be accessed without input of credentials (e.g., username/password, etc.). The site analyzer 110 may also access sites using different perspectives, as discussed below with reference to FIG. 5, to determine variations of site data served to different user devices. Perspectives may include access of a site having different language versions, mobile/native versions, browser variations, paid/free versions, and so forth. Additional details about the site analyzer 110 are provided below.

The service provider 102 may have access to user data 118, which may include payment data 120 and/or other data 122, such as address or contact information including phone numbers, emails, etc. The payment data may include information to enable use of a payment instrument, such as credit card numbers, expiration dates, bank account numbers, and/or other payment information. In some embodiments, some or all of the user data 118 may be stored on the user device 104. However, the user data 118 may be stored or at least accessible by the service provider 102 in some embodiments.

The service provider 102 may include a script generator 124 that generates scripts to perform specific functions on behalf of the user and that are associated with one or more of the sites. For example, the script generator 124 may generate a script that updates or switches default payment information stored by a site with little or no user action. The script may be generated based on the site data 112 collected and generated by the site analyzer 110. The script may be used to cause the user device to interact with a site, and thus may be executed by the user device. In some embodiments, the user device 104 may sent a request 126 for a script. The service provider 102 may then transmit a script 128 to the user device 104. The script 128 may include one or more rules that may be dynamically implemented to cause the user device to perform specific operations with a site, such as input credentials, update data, and/or perform other functions. The rules may enable the script to interact with different variations of data provided by a site, such as data provided to a mobile device (i.e., mobile version of a site), data in a particular language (e.g., German, French, English, etc.), and so forth. Additional details about the script generator 124 are provided below.

As discussed above, the user device 104 may execute the scripts received from the service provider 104. By executing the scripts on the user device 104, the user may more fully control execution of the scripts and control use of the user's personal data, especially when the user data is stored, at least in part, on the user device 104. Further, execution of the script by the user device 104 may minimize errors or connectivity problems caused by security features of some sites, which may fingerprint a user device approved to access the site, etc. The user device 104 may send a script 130, which may be modified by the user device 104 after receipt from the service provider, to a site. For example, the modification may be to input personal information that is stored on the user device into the script. The site may then send a result 132 to the user device in response to execution of the script 130. For example, when the script is used to update persona data, the result 132 may be a confirmation page that the data has been successfully updated. In some embodiments, the user device 104 may forward or send information pertaining to the result to the service provider 102 for collection by an event logger, as further explained below. The user device 104 may include an application that presents one or more user interfaces 134 that enable the user 103 to interact with the service provider, manage information, cause updates of information (via the scripts), and/or perform other functions discussed herein. Some examples of possible user interfaces are provided in FIGS. 8-14.

Figure 2A:
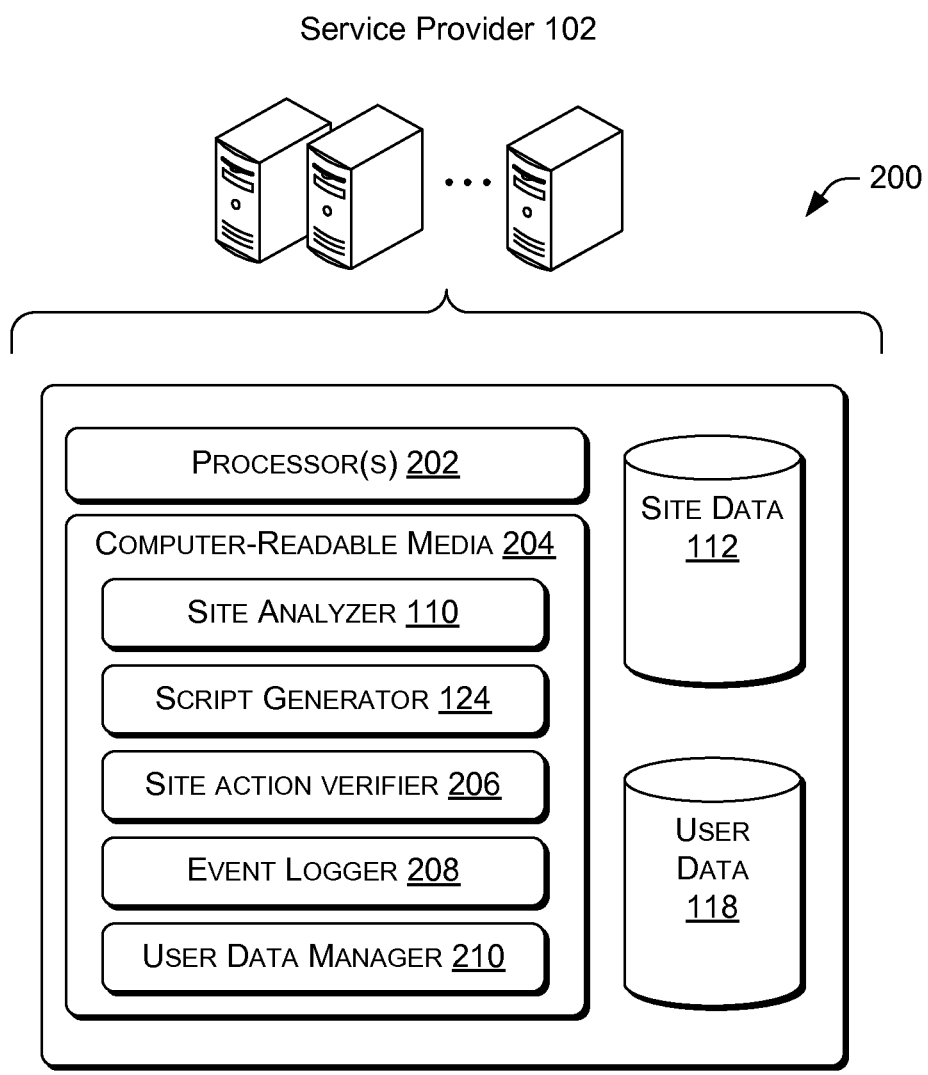
FIG. 2A is a block diagram of an illustrative computing architecture of the service provide shown in FIG. 1.

FIG. 2A is a block diagram of an illustrative computing architecture 200 of the service provide 102 shown in FIG. 1. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service provider 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store the site analyzer 110, the script generator 124, a site action verifier 206, an event logger 208, and a user data manager 210, which are described in turn. In addition the computing architecture 200 may include the site data 112 and possibly at least some of the user data 118. The site data 112 and/or the user data 118 may be input and/or updated by the user device 104 via interaction with UI discussed below with reference to FIGS. 8-14. The components may be stored together or in a distributed arrangement.

The site analyzer 110 may access various data provided from a site, such as pages and other content, including input forms. For example, the site analyzer 110 may crawl all pages provided by a site, such as a host uniform resource located (e.g., www.website.com). The site analyzer 110 may determine input fields and assign a purpose to respective input fields. For example, the site analyzer 110 may determine that a first email input field is used to subscribe to a newsletter while a second email input field is used to confirm a user identity. The site analyzer 110 may determine a purpose of an input field based on sematic analysis of information on a page or proximate to the input field, links associated with the page, spatial information in the page (e.g., tree distance describing how many hops to traverse the tree, a pixel distance, etc.) between different input fields, and/or other information. In some embodiments, the site analyzer 110 may seek to identify certain features of a site and thus not analyze the entire site. For example, the site analyzer 110 may determine how to access a portion of the site used to set or change a default payment instrument, which may be an intended goal of an operation performed by the service provider, for example. Once this part of the site is identified and analyzed, other remaining portions of the site may not be analyzed. The site analyzer 110 may populate the site data 112 with data for many sites, and possibly for different versions of a same site.

The script generator 124 may use the site data 112 to create scripts that cause a user device to perform certain predetermined functions with little or no user input. For example, the scripts may cause a user device to update a default payment type, update an address, and/or input other information to a site (e.g., credentials, personal data, etc.). An example of minimal user input is the user having to manually read and input a CAPTCHA or other security question. The script generator 124 may create scripts that function with different versions of the site and/or after some changes to the site, such that the scripts may include rules to enable dynamic decision making during interaction with the site. This may enable successful interaction with a site despite access to the site using a particular perspective (e.g., language, browser type, device type, Internet Protocol (IP) address, etc.). For example, dynamic rules may be implemented by the script to inspect a page retrieved by a user device and then take certain predetermined actions based on the data included in the retrieved page. Thus, the scripts may be robust to enable navigation and input of data to various different versions of a site (e.g., different language, different presentations, and so forth).

The site action verifier 206 may verify proper functionality of scripts before the scripts are issued to the user device or in response to other triggers, such as reported errors associated with scripts. In some embodiments, the site action verifier 206 may be emulated or executed on different devices, such as mobile devices, notebook computers, tablet computers, and/or other devices to mimic use by a user device. The site action verifier 206 may output results, which may trigger human inspection and/or updates by the script generator 124 when the script does not function as anticipated or as desired (i.e., the script does not complete an intended task).

The event logger 208 may capture data from the user devices in response to interaction with the scripts and/or other interactions with the sites 106. For example, when a user device executes a script that unsuccessfully performs an operation, the user device may send an entry to the event logger 208 to record the failure event. The event logger 208 may also record successful execution of scripts, which may be helpful to determine that an error is local or temporal, and not experienced by at least some other devices, for example.

The user data manager 210 may enable input and/or control of at least some of the user data 118 that may be stored and/or accessible by the service provider 102. For example, when at least some of the user data 118 is stored in the computing architecture 200, the user data manager 210 may enable a user to input user data, modify user data, delete user data, and/or perform other functions with the user data. The user data may include personal information, payment information, contact information, site information (e.g., credentials such as username/password, preferences, etc.), and/or other user data.

Additional functionality of the components of the service provider 102 are discussed with reference to the flow diagrams shown in FIGS. 3-7 and the following discussion included below.

Figure 2B:
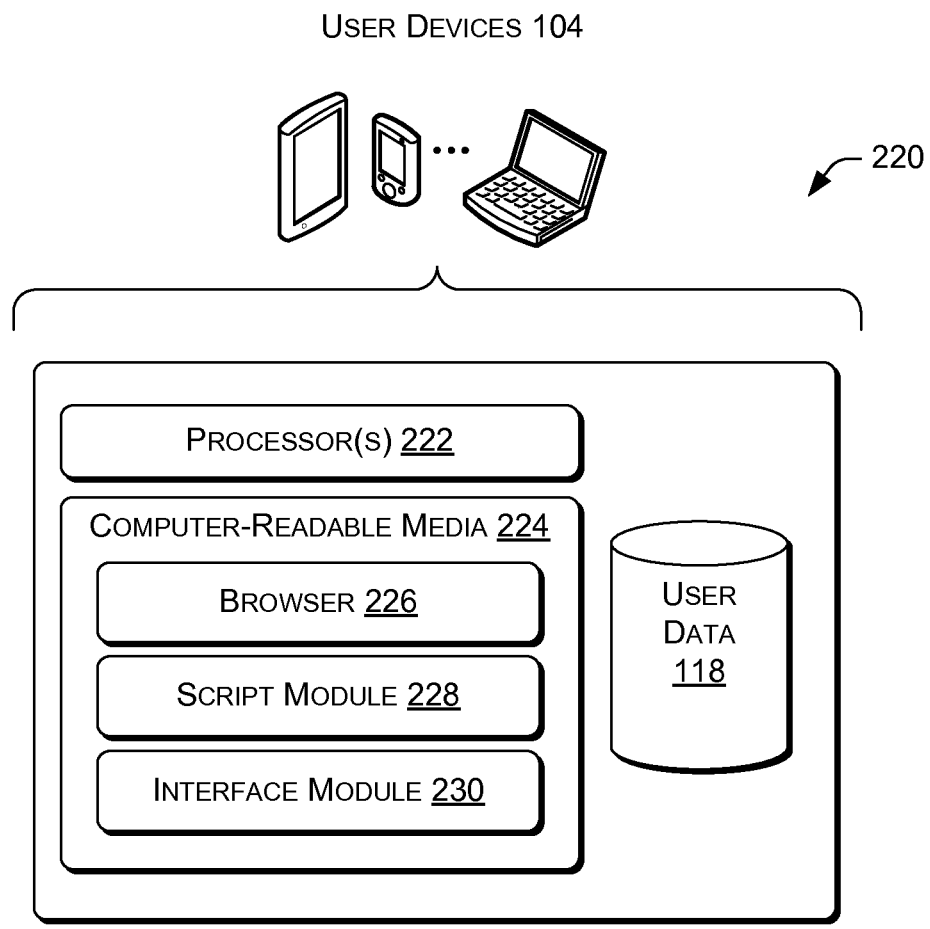
FIG. 2B is a block diagram of an illustrative computing architecture of the user device shown in FIG. 1.

FIG. 2B is a block diagram of an illustrative computing architecture 220 of the user device shown in FIG. 1.

The computing architecture 220 may include one or more processors 222 and one or more computer readable media 224 that stores various modules, applications, programs, or other data. The computer-readable media 224 may include instructions that, when executed by the one or more processors 222, cause the processors to perform the operations described herein for the user device 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 224 may store a browser 226, a script module 228, and an interface module 230, which are described in turn. The computing architecture 220 may also include at least some of the user data 118, which may be stored in the computer-readable media 224 and/or in other memory.

The browser 226 may be a conventional web browser or other application that is configured to enable an exchange of data with the sites 106. In some embodiments, the browser 226 may be a specialized application used to access a specific content provider. However, the browser 226 may typically be implemented as a general purpose application that can read hypertext markup language (HTML) documents and other documents and languages commonly associated with data available by way of the Internet. The browser 226 may include one or more plug-ins and/or toolbars that enable at least some of the functionality discussed herein.

The script module 228 may enable execution of a script provided by the service provider 102. The script module 228 may operate to cause the browser 226 or another resource or application to perform certain predetermined functions with little or no user interaction. Scripts may be requested and caused to execute via use of the UIs described below with reference to FIGS. 8-14 and possibly using other triggers. Thus, the script module 228 may execute the script on the user device 104, possibly as a plug-in or toolbar associated with the browser 226. In some embodiments, the script module 228 may update the script with at least some of the user data 118, such as to add payment information, cookies, user credential, etc. to a script that causes an update of the information at one of the sites 106. However, the user information may already be included in the script in some instances when the information is available to the script generator 124 (e.g., when the user data 118 is available by the service provider 102). The script module 228 may receive the scripts form the service provider 102 and/or may transmit event log information back to the service provider 102 in response to execution of a script, such as to report an error event, report a successful event, and/or report other information such as a change in a site or other site data.

The interface module 230 may enable user interaction with one or more of the user interfaces 134, such as the UIs shown in FIGS. 8-14. The interface module 230 may operate with the browser 226 and/or independent from the browser 226 to enable management, creation, and update of the site data 112, the user data 118, execution of scripts, and other functions discussed herein. The interface module 230 may link the UIs to implement functionality of the script module 228.

Additional functionality of the components described above with reference to FIGS. 2A and 2B is discussed with reference to various flow diagrams shown in FIGS. 3-7 and described below.

FIGS. 3-7 show flow diagrams that illustrative various example processes. The processes are illustrated as a collection of blocks in a logical flow graph, which represent a sequence of operations that can be implemented in hardware, software, or a combination thereof. In some instances, the collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
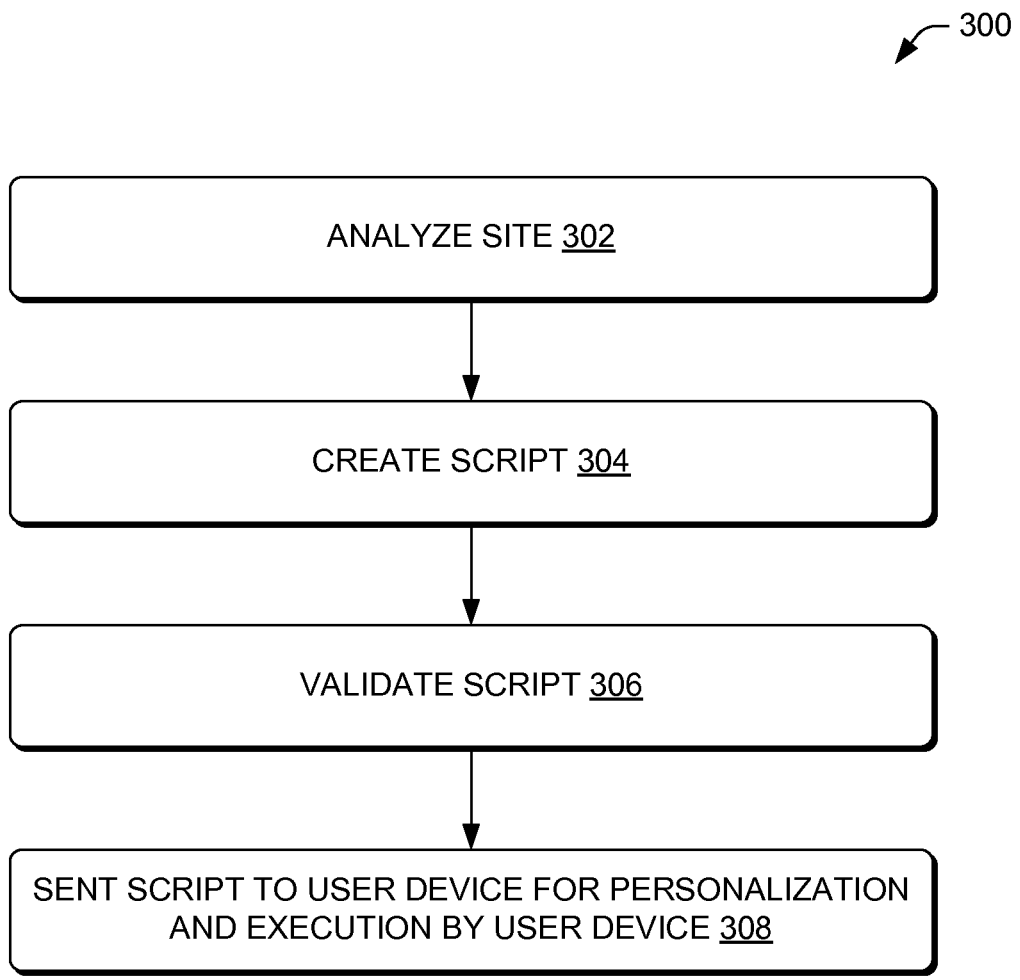
FIG. 3 is a flow diagram of an illustrative process to create a script for use by a user device to update remotely stored data.

FIG. 3 is a flow diagram of an illustrative process 300 to create a script for use by a user device to update remotely stored data. The process 300 is described with reference to the environment 100 and may be performed by the service provider 102. Of course, the process 300 may be performed in other similar and/or different environments.

At 302, the site analyzer 110 may analyze a site to determine content and/or input fields available via the site. For example, the site analyzer 110 may access various pages of a site to create a site directory. The site analyzer 110 may determine functionality associated with different pages or portions of content provided by the site, such as input fields used to login, update account information, input a default payment instrument, update user information, update preferences, and so forth. For example, the site analyzer 110 may perform a spatial analysis and/or a semantic analysis of pages to determine a purpose of the respective pages and/or purpose of input fields on the pages. In some embodiments, the site analyzer may analyze a site for a specific function while refraining from storing data for other parts of the site. However, the site analyzer 110 may determine exhaustive data for a site. The analysis may be used to create the site data 112. The site analyzer 110 may view the site from different perspectives to capture differences in the site based on language, browser type, device type, free/paid versions, and so forth.

At 304, the script generator 124 may generate a script to perform a specific function while interacting with a site. The specific function may be as simple as logging into a site (e.g., proving credentials to access privileged portions of the site like a user account, etc.) or as complex as replacing a default payment instrument with a new default payment instrument. The functions may include navigation within a site, population of input fields (and submission of data), among other possible tasks. The script may be created by the service provider 102 and then sent to the user device 104 for execution. The script may perform functions with little or no human interaction, such as update a default payment instrument stored at the site, provide login credentials to access portions of the site and/or perform other functions. The script generator 124 may use the site data 112 to create a robust script that includes dynamic rules that function despite variance of the site across caused by different perspectives used to access the site (e.g., different locations, languages, devices, account types, etc.). Thus, the script generator 124 may generate a script that includes rules that cause functionality in response to identified content retrieved during a current interaction with the user device when executing the script.

At 306, the site action verifier 206 may test the script. The site action verifier 206 may be executed by different types of devices, different browsers, in different languages, different account types, in different regions/countries, and/or using other differences to change perspectives, which may enable identification of any failures of the script. The site action verifier 206 may preform repeat testing to ensure that scripts operate as expected. The testing may be performed prior to shipment of any script, or over time and after some shipments to ensure continued compatibility and functionality.

At 308, the service provider 102 may send the script to the user device 104, possibly in response to a request, to enable the user device 104 to execute the script. The user device 104 may execute the script using a script module 228, which may cause a browser or other application to perform specific tasks on behalf of a user. The script may include at least some information in the user data 118, which may be inputted into the script by the script generator 124 at the service provider 102 and/or input by the script module 228 at the user device 104.

Figure 4:
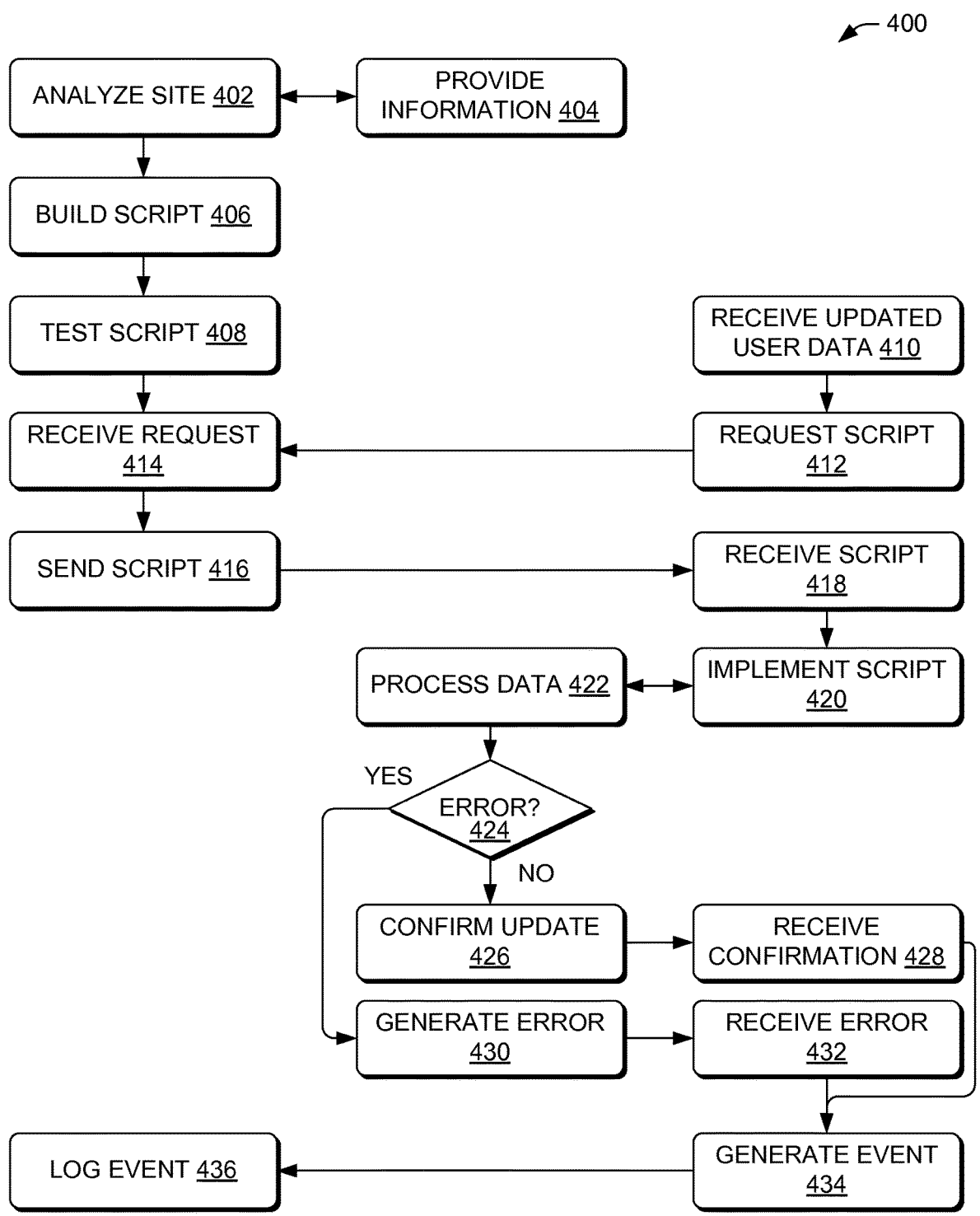
FIG. 4 is a flow diagram of an illustrative process to generate and use a script to cause a user device to update remotely stored data at a site.

FIG. 4 is a flow diagram of an illustrative process 400 to generate and use a script to cause a user device to update remotely stored data at a site. The process 400 is described with reference to the environment 100. Of course, the process 400 may be performed in other similar and/or different environments. As shown in FIG. 4, the service provider 102, the site 106(1), and the user device 104 may exchange information through one or more networks such as the networks 108. However, other devices and other configurations may be used to implement the process 400.

At 402, the service provider 402 may deploy the site analyzer 110 to exchange data with the site 106(1), and possibly other associated sites, to determine site data. The site 106(1) may provide information at 404, which may include input fields, text, images, pages, and/or other static or dynamic content for analysis by the site analyzer 110.

At 406, the script generator 124 may build a script to perform a specific function. The script generator 124 may build the script based on the site data 112.

At 408, the site action verifier 206 may test the script using a validation test or tests to verify that the script successfully performs an intended function. The testing may be performed on a variety of devices, possibly under control of the service provider 102 or under direction of the service provider 102. In some embodiments, the testing may be an iterative processes, such that when a script fails a validation test, the script is recreated, such as by reverting to a prior operation in the process 400 and possibly with assistance via human inspection. Thus, the process 400 may include one or more loops based on the operation 408 when the script does not perform as intended.

At 410, the user device 104 may receive updated user data, which a user associated with the user device 104 may desire to pass or extend (write) to the site 106(1) and possibly to other sites. The user data may include an update to a payment instrument or a new payment instrument, a change in personal information and/or communication information, and/or other user data.

At 412, the user device 104 may request a script to perform a specific function. As an example, the specific function may be switching, at a site, a default payment instrument from a first payment instrument to a second payment instrument. The user of the user device 104 may desire to do this in response to updating an expired payment instrument, fraudulent activity (stolen card, etc.), obtaining a payment instrument with better benefits, and/or for other reasons. The user may use the interface module 230, via the user device 104, to initiate the function and request for the script. The request may be received at 414 by the service provider 102, which then in turn may send the corresponding script at 416. In some embodiments, the script may be updated to include at least some of the user data 118, possibly inputted from the operation 410. The user data may be input into the script by the service provider 102, by the user device 104, or by both, depending on a storage location of the user data and specific configurations or user preferences. For example user credentials may be input locally on the user device 104 while payment information may be input remotely by the service provider 102. The script may be received by the user device 104 at 418.

At 420, the user device 104 may implement the script via the script module 228. The script may cause the user device 104 to exchange data with the site 106(1) and process data at 422. Execution of the script may result in multiple exchanges of data between the site 106(1) and the user device 104 in some instances, such as when multiple operations are performed (e.g., credentials, navigate pages, update payment information, etc.). Following at least some actions and the processing of data at 422, the site 106(1) may determine whether an error has occurred at 424. The error may be a result recognized by the site 106(1), but that is different from an intended result. Thus, the error may be proper receipt of an unintended outcome (e.g., acceptance of a null field, etc.). When no error occurs (following the "no" route from the decision operation 424), the process 400 advances to the operation 426 where the update is confirmed and a confirmation is sent to the user device 104 for receipt at 428. When an error occurs (following the "yes" route from the decision operation 424), the process 400 advances to the operation 430 where the error is generated and communicated to the user device 104 for receipt at 432. Following either the operation 428 or the operation 432, the script module 228 may generate a reporting event at 434 for communication to the event logger 208 of the service provider 102 for receipt at 436. Thus the event logger 208 may log data for successful and unsuccessful events associated with use of the script.

Figure 5:
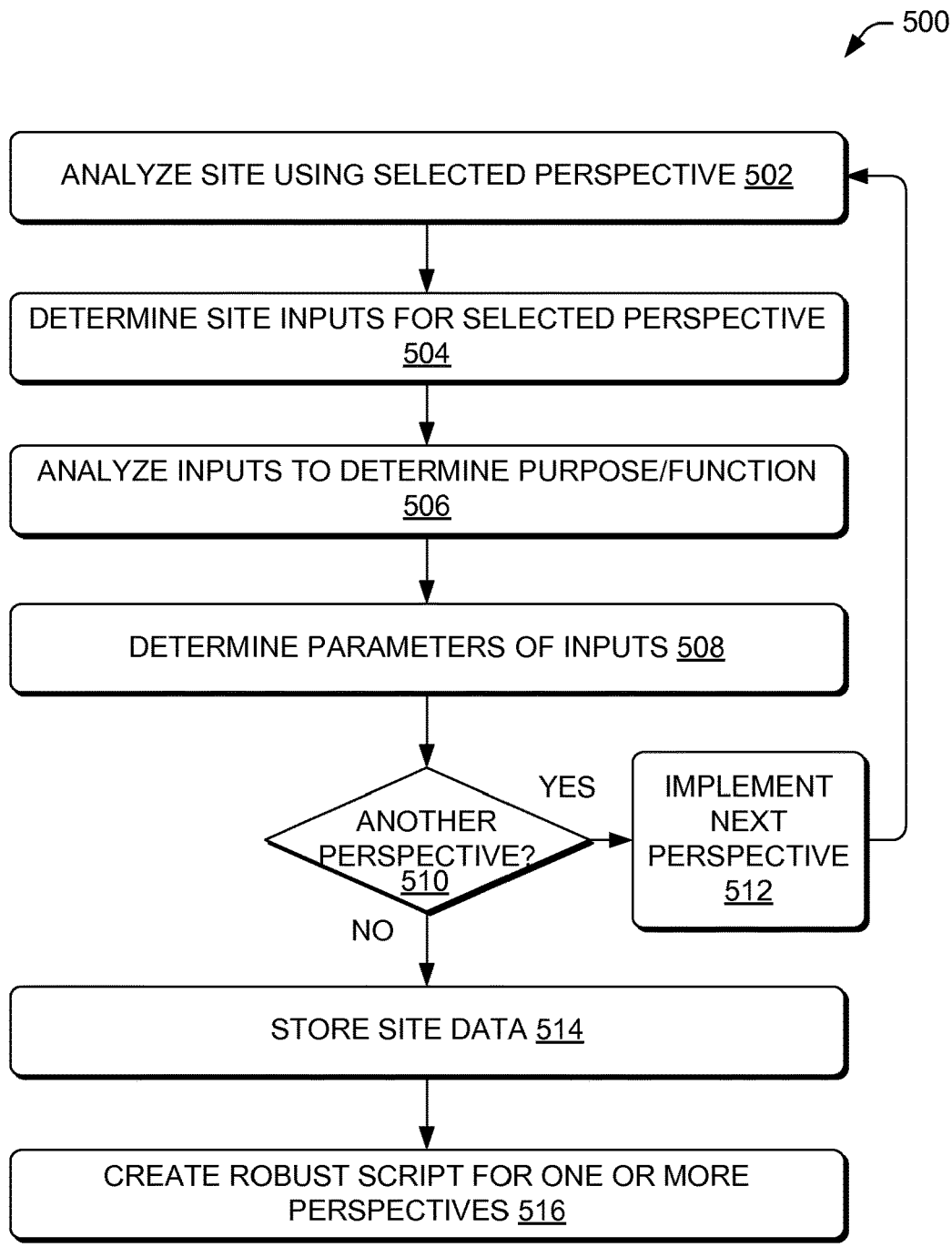
FIG. 5 is a flow diagram of an illustrative process to analyze sites using different perspectives that relate to variations in device configurations employed by different user devices.

FIG. 5 is a flow diagram of an illustrative process 500 to analyze sites using different perspectives that relate to variations in device configurations employed by different user devices. The process 500 is described with reference to the environment 100 and may be performed by the service provider 102. Of course, the process 500 may be performed in other similar and/or different environments.

As discussed herein, a "perspective" is used to describe variations of data received or displayed by a user device based on how the site is accessed. The perspective may change based on a browser or application used to access the site, a language of the site (e.g., German, French, English, etc.), an IP address used to access the site, a location of the user device, a display size or other attributes of the user device 104, a paid state or unpaid state of the site access, and/or other factors which may result in differences in the received data from the site or the display of the site at the user device 104. These differences are accounted for by the script, possibly via dynamic rules, to enable the script to cause the user device to perform an intended action.

At 502, the site analyzer 110 may analyze a site using a selected perspective. The perspective may be implemented by emulating a particular attribute, parameter, etc. that defines the perspective. For example, the site analyzer 110 may analyze a mobile version of a site, a German version of the site (e.g., www.website.de) which may be a redirected site based on a location of an accessing device, and so forth. As another example, the credentials used to access the site may be credentials associated with a free version or standard version of the site.

At 504, the site analyzer 110 may determine site input fields and/or other site data associated with the selected perspective. The operation 504 may be performed as described above for the operation 302, but in association with the selected perspective. The site data 112 may be associated with the perspective.

At 506, the site analyzer 110 may analyze input fields to determine a purpose of the input fields, such as using spatial and/or semantic information provided by the site. For example, the site analyzer 110 may determine a purpose of an input field based on sematic analysis of information on a page or proximate to the input field, links associated with the page, spatial information in the page (e.g., tree distance describing how many hops to traverse the tree, a pixel distance, etc.) between different input fields, and/or other information.

At 508, the site analyzer 110 may determine parameters for input of the information in the input fields. For example, the site analyzer 110 may determine one or more formats that are accepted by the input field, how to modify the input field (e.g., select pull down option, input text, select button, move slider, etc.), and/or other parameters associated with input fields.

At 510, the site analyzer 110 may determine whether to access the site using a different perspective to further populate the site data 112. For example, the site analyzer 110 may determine to access a premium or paid version of the site, which may include additional functionality and/or input fields. When the site analyzer 110 determines to implement another perspective (following the "yes" route from the decision operation 510), then the process 500 may advance to an operation 512 to implement the perspective and return to execute the operations 502 through 508. When the site analyzer 110 determines not to implement another perspective (following the "no" route from the decision operation 510), then the process 500 may advance to an operation 514.

At 514, the site analyzer 110 may store collected data from the operations 502 through 508 as the site data 112, which may include an association with the perspective. For example, the site data 112 may indicate if the data is included in a standard version of the site, a premium version of the site, or both. As another example, the site data 112 may indicate variations based on language, access location (e.g., location of the user device 104 accessing the site), different browsers, different devices types (e.g., large screen versus small screen, slow processor versus fast processor, etc.), and so forth.

At 516, the script generator 516 may create a script that operates for one or more of the perspectives. For example, the script generator 516 may create a robust rule set within the script that allows the script to successfully perform a specified function on the site despite the perspective of the site obtained by the user device that execute the script. In some embodiments, the script generator 124 may generate different scripts for a site, which some scripts only work with certain perspectives (e.g., on a mobile version of the site, etc.). In these embodiments, the service provider 102 may determine a perspective of a user device prior to sending the script to the user device 104 for execution.

The perspectives may be obtained using different techniques, such as by collection of information by the event logger 208 from errors experience by user devices having different perspectives. Thus, the perspectives, and corresponding attributes, parameters, etc., may be discovered by reporting to the event logger, which may then initiate inspection of the site via the particular perspective. The perspectives may also be determined by using different test devices to access sites, such as tablet devices, mobile phones, desktop computers, and so forth, possibly using different browsers, located in different regions, and so forth.

Figure 6A:
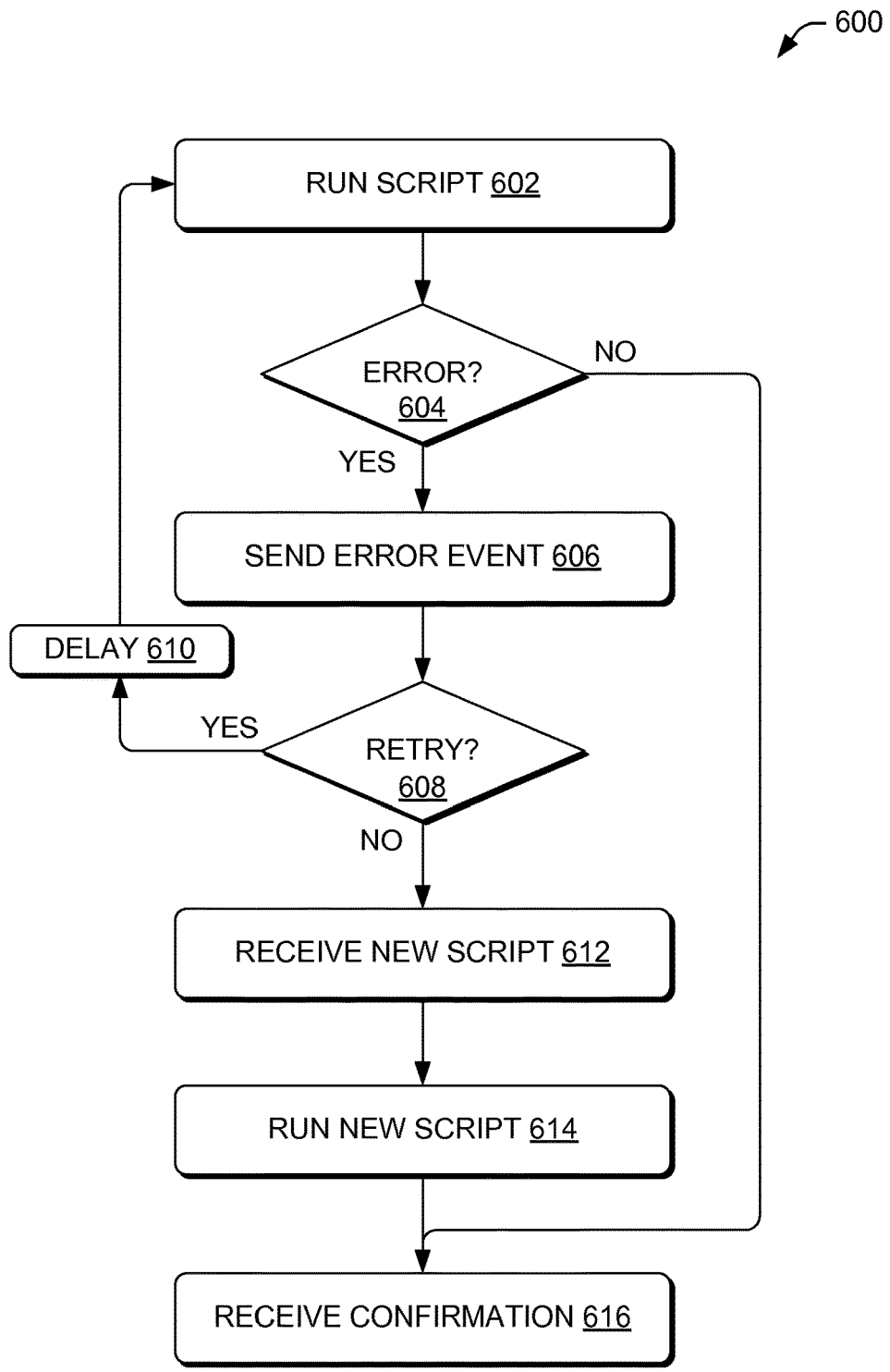
FIG. 6A is a flow diagram of an illustrative process of a user device to process errors associated with a script used to update remotely stored data.

FIG. 6A is a flow diagram of an illustrative process 600 of a user device to process errors associated with a script used to update remotely stored data. The process 600 is described with reference to the environment 100 and may be performed by the user device 104. Of course, the process 600 may be performed in other similar and/or different environments.

At 602, the script module 228 may run or execute a script 602. The operation 602 may be similar to the operation 420 described above with reference to FIG. 4. The script module 228 may cause the browser to perform actions in accordance with the script, which may or may not be visible to the user. For example, the script module 228 may cause the browser to perform background actions or tasks in accordance with the script. The background actions or tasks may not be readily visible to the user, and thus may allow the user to perform other tasks during execution of the script.

At 604, the script module 228 may determine whether execution of the script has resulted in an error. The error may be determined by a prompt or reply received by a site that is modified by the script. For example, the error may be detected when an input form is represented during execution of the script following entry of information into the input form. As another example, an error may be determined in response to analyzing a confirmation of inputted information and determining the confirmed input is not the same an intended input. Other errors may occur due to connectivity, timeouts, or other data processing or communication errors. Regardless of the technique, the decision process 604 may determine whether an error has occurred. When an error has occurred (following the "yes" route from the decision operation 604), then the process 600 may advance to an operation 606.

At 606, the script module 228 may send an error event to the event logger 208 of the service provider 102. The event logger 208 may track occurrences of errors to determine whether an error is localized (e.g., device specific, regional, etc.) or global (e.g., affects most or all devices). In some embodiments, the event logger 208 may provide a reply to the message at 606 to instruct the user device (and script) to retry the script, such as when the error appears to be a local error or error that may be remedied by retrying the script or part of the script.

At 608, the script module 228 may determine whether to retry to perform an action using the script. As discussed above, some errors may be remedied by retrying an action with or without a delay due to errors that are temporary (e.g., dropped data, lost connectivity, etc.). For example, a connection error may be remedied by regaining connectivity and preforming an action caused by the script. Other errors may not be remedied, such as errors resulting from changes to content or input fields served by the site. The script module 228 may determine to retry an action based on information from the event logger 208 and/or from local information from the script module 228. When the script module 228 determines to retry an operation (following the "yes" route from the decision operation 608), then the process 600 may advance to an operation 610. At 610, the script module 228 will undergo a delay and then advance to the operation 602 to run the script or continue the script. The length of the delay may be based on a type of error. For example, a connection error may require a longer delay (used to reestablish connection) than another type of error. The delay may be based on factors other than time, such as location, reconnection, etc.

When the script module 228 determines not to retry an operation (following the "no" route from the decision operation 608), then the process 600 may advance to an operation 612. At 612, the script module 228 may receive a new script that may be used to remedy the error determined in the process 600. For example, the new script may be recently generated by the script generator 124 in response to reporting of the error at the operation 606. In some embodiments, the new script may be an update to an existing script. However, the new script may be an entirely new script.

At 614, the script module 614 may run the new script and/or run a portion of the script (e.g., an updated portion that remedies the error). In some embodiments, the operation 614 may lead to the decision 604 described above, which determines whether an error has occurred using the script. For simplicity of explanation, the process 600 continues at an operation 616.

At 616, following the operation 614 or when no error has occurred following the "no" route from the decision operation 604, the script module 228 may receive confirmation of a successful performance of the script, such as by a confirmation page that indicates an intended result or by other information received by the script module 228 from the site.

Figure 6B:
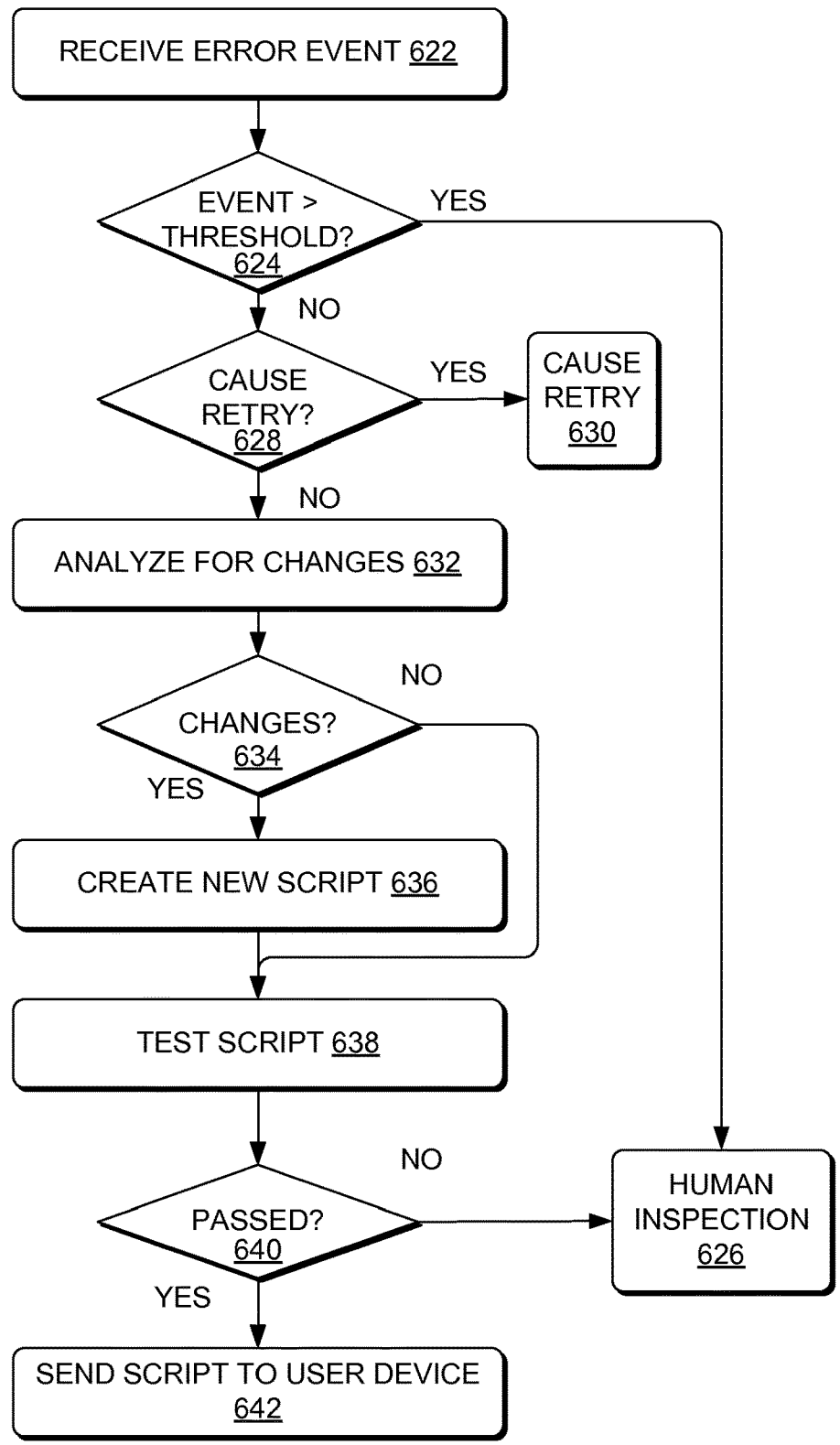
FIG. 6B is a flow diagram of an illustrative process of a service provider to process errors associated with a script used to update remotely stored data.

FIG. 6B is a flow diagram of an illustrative process 620 of a service provider to process errors associated with a script used to update remotely stored data. The process 620 is described with reference to the environment 100 and may be performed by the service provider 102. Of course, the process 620 may be performed in other similar and/or different environments. The process 620 may occur in response to the operation 606 described above with reference to FIG. 6A.

At 622, the event logger 208 may receive error event from the script module 228 of the user device 104. The event logger 208 may log the event, such as by recording an occurrence of the event along with other events received from other user devices or sources.

At 624, the event logger 208 may determine whether the event from the user device 104 has reached or exceeded a threshold. The threshold may determine that the event requires human inspection at 626. As an example, when the same device reports the error more than once (or another threshold value) within a certain amount of time (possibly a threshold value), then the request may be routed to a human at 626 for inspection and resolution. This may expedite a remedy of the error. When the event has not reached or exceeded the threshold (following the "no" route from the decision operation 624), then the process 620 may advance to an operation 628.

At 628, the event logger 208 may determine whether to instruct the user device 104 to retry to existing script. If the error has not been reported before and is a first time error for the device, then the determination may be to cause the user device 104 to retry to script at 630. For example, the error may be caused by a connection interruption between the user device 104 and the script 106 or other "local" error. However, if the error has been logged before and is determined to be associated with a change in the site or other "global" error, then the event logger 208 may determine to proceed to the operation 632.

At 632, the site analyzer 110 may analyze the site and/or other data sources to determine whether changes have been made to the site since a prior analysis of the site and/or whether other data sources have changes. Other data sources may include rules sets used to create, maintain, and execute scripts, changes to user devices and/or configuration of user devices (e.g., change of software, corrupt files or application, etc.), and so forth. In some embodiments, the analysis at 632 may be directed to a portion of the site related to the error since some sites updates some pages of their sites without updating the entire site. In various embodiments, the site analyzer 110 may compare a prior fingerprint of the site (and/or other data) to a new fingerprint of the site (and/or other data) to determine whether the site (and/or other data) has been updated and possibly to determine an extent of an update of the site (and/or other data).

At 634, the site analyzer 110 may determine whether changes to the site are present where the changes caused the script to fail. When changes are present (following the "yes" route from the decision operation 634), then the process 620 may continue at an operation 636.

At 636, the script generator may create a new script or update a portion of an existing script (which is also referred to herein as a "new script"). The new script may be generated as discussed above for the operation 304 described with reference to FIG. 3. However, the new script may only include an update to portions of the script that access parts of a site that have changed based on the analysis performed at 632.

At 638, following the operation 636 or when no changes are present (following the "no" route from the decision operation 634), the script generator 124 may test the script (or the new script) to verify proper functionality. The test may include a test from a perspective that is the same or similar to a perspective of the user device 104 that reported the error. The test may be the same or similar to the operation 306 discussed above with reference to FIG. 3.

At 640, the script generator 124 may determine whether the script (or new script) passed the test at the operation 638. When the script passed the test and was performed successfully (following the "yes" route from the decision operation 640), then the process 620 may advance to an operation 642.

At 642, the service provider 102 may send the script to the user device, which may be received via the operation 612 of the process 600 described with reference to FIG. 6A. When the script fails the test and was not performed successfully (following the "no" route from the decision operation 640), then the process 620 may advance to the operation 626 for human inspection. The human inspection may create a task for an analyst to manually resolve the error.

Figure 7:
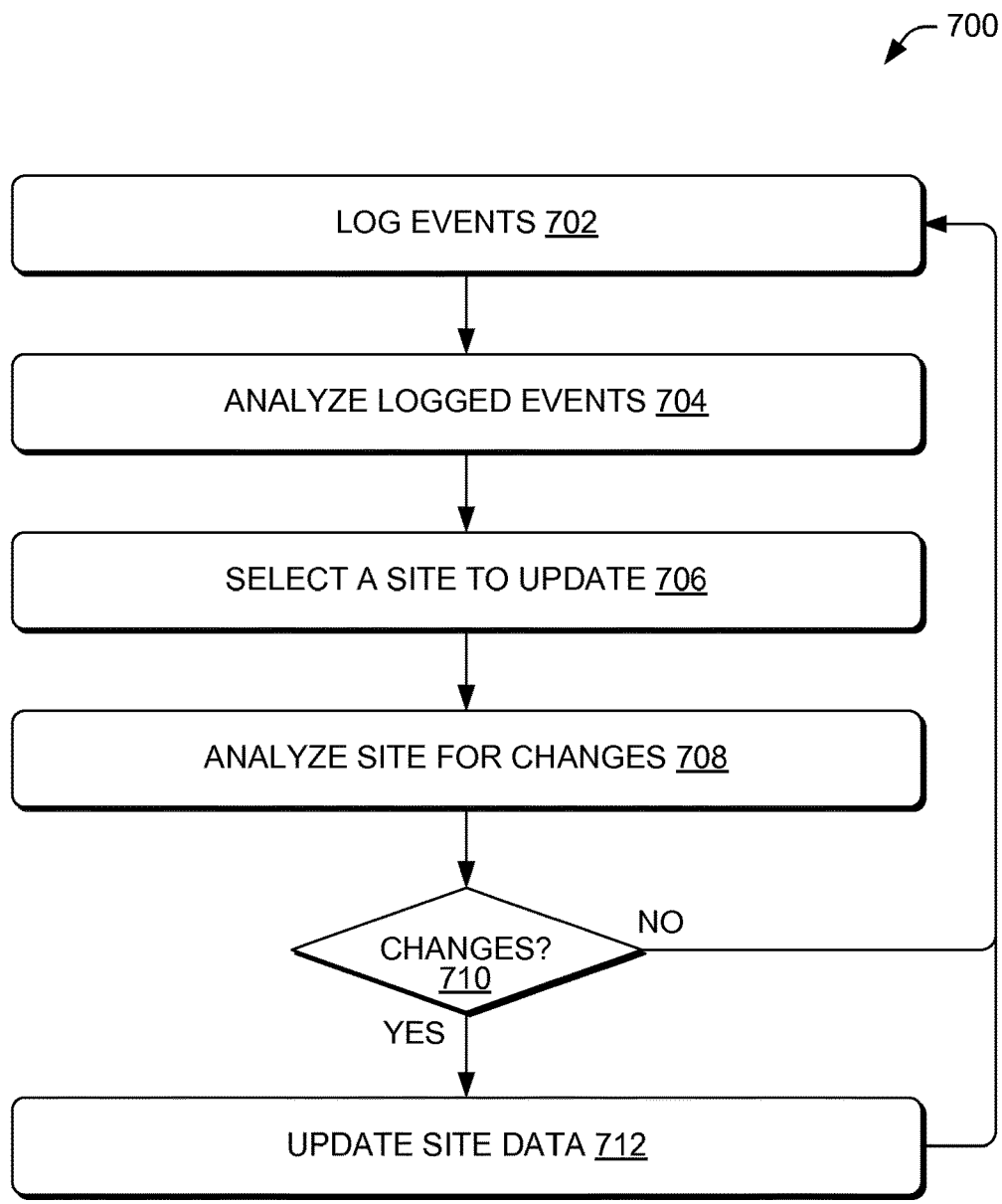
FIG. 7 is a flow diagram of an illustrative process to capture event data and update scripts based on the event data.

FIG. 7 is a flow diagram of an illustrative process 700 to capture event data and update scripts based on the event data. The process 700 is described with reference to the environment 100 and may be performed by the service provider 102. Of course, the process 700 may be performed in other similar and/or different environments. Some operations of the event logger 208 are discussed above with reference to FIGS. 6A and 6B. The event logger 208 may perform events in response to other triggers beyond receipt of errors.

At 702, the event logger 208 may receive an event to log or otherwise record or store. The event may be logged in a database and categorized with one or more descriptors that attributes of the event. In some embodiments, the event logger may store event information in the site data 112. The attributes may include information associated with a user device that reported the event, such as a perspective, location, and/or other user device information. The attributes may indicate an outcome of the event (e.g., success, error, retry, etc.). In some embodiments, the event may be access of an input field not currently supported by a script or other "new" information that may be used to cause an update to the script or cause a new analysis of the site.

At 704, the event logger 208 may analyze the logged events. The analysis may identify sites or portions of sites that may require an update or a more thorough analysis by the site analyzer 110. In some embodiments, the analysis may identify changes to sites based on new input fields accessed by user, trends in errors or retry events, and/or other actions that may trigger an update to a site or an analysis of a site by the site analyzer 110.

At 706, the event logger may select a site to update. The update may be a full update, which may be performed as if the site were new, or may be a partial update, which may use some existing information about the site from a previous analysis of the site.

At 708, the site analyzer 110 may analyze the site for changes. The analysis may be similar to the operation 302 described with reference to FIG. 7. The analysis may target portions of the site based on information provided by the event logger 110, such as new features of the site, portions of the site prone to errors, and/or other portions of the site. In some embodiments, the site analyzer 110 may obtain a fingerprint of the site, which may sample portions of the site, and compare the fingerprint to a prior fingerprint to determine changes in the site, for example.

At 710, the site analyzer may determine whether changes are present on the site based on the analysis at the operation 708. When changes are present (following the "yes" route from the decision operation 710), then the process 700 may advance to an operation 712 to update the site data 112. The script generator 124 may then use the updated site data to create a new script. When changes are no present (following the "no" route from the decision operation 710), or following the operation 712, the process 700 may advance to the operation 702 and continue to log events.

FIGS. 8-14 show example user interfaces (UIs) which enable management of payment information and updating payment information, such as payment instruments, using the techniques and systems described above. The techniques and systems described above are not, however, limited to the following specific use-cases. Thus, the techniques and systems described above may be used to perform tasks other than switching or updating payment instruments stored at various sites and/or accessing payment information. The UIs that follow show general features that may cause execution of computing instructions by the script module 228, possibly via the interface module 230. The scripts are generated by the script generator 124 as discussed above. The UIs may be accessible via the browser 226 and/or via other application(s).

Figure 8:
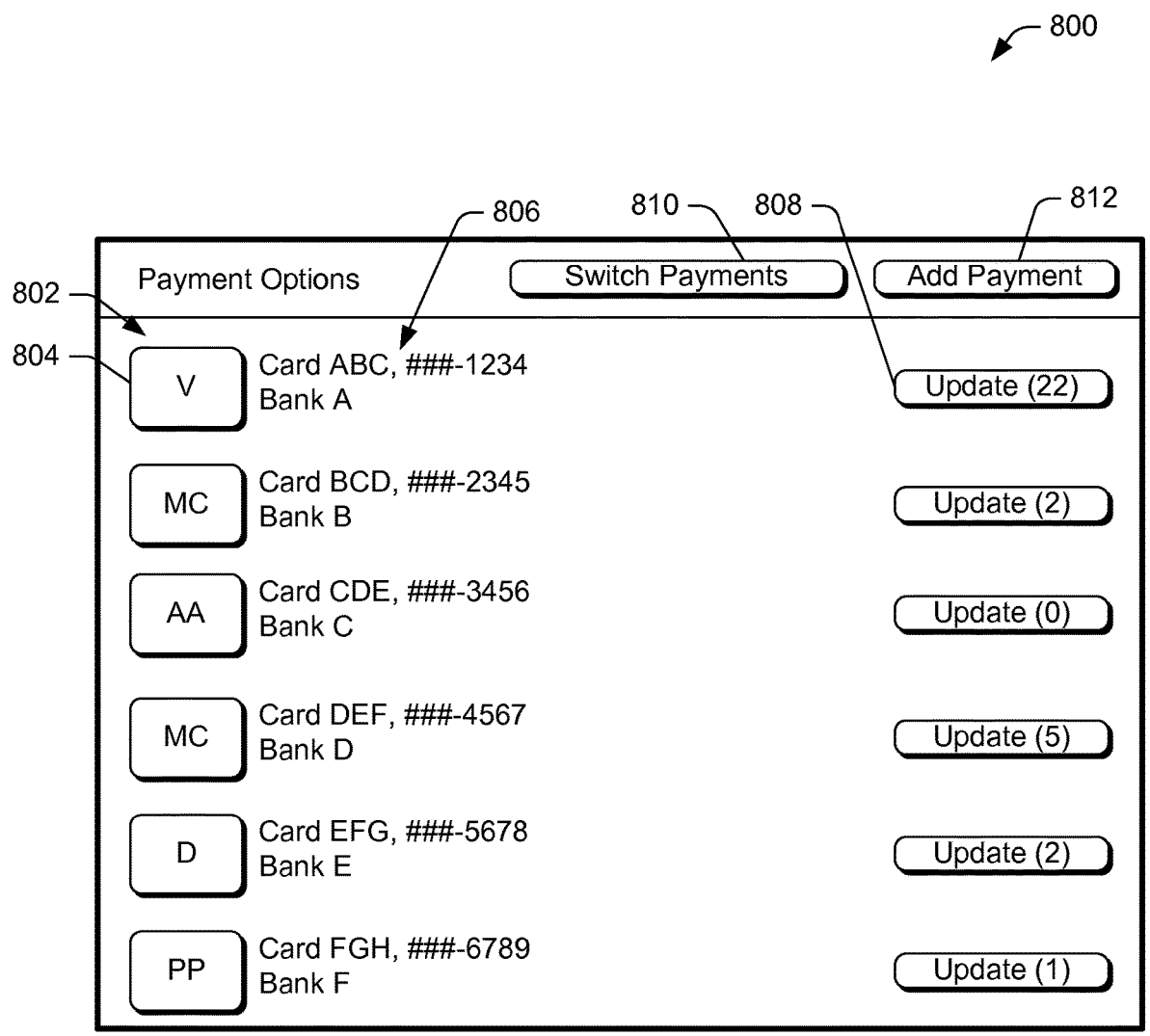
FIG. 8 shows an illustrative user interface (UI) that includes a payment management interface to enable at least switching default payment instruments stored remotely at different sites.

FIG. 8 shows a UI 800 that includes a payment management interface to enable at least switching default payment instruments stored remotely at different sites. The UI 800 includes payment instruments 802, which may be credit cards, checking accounts, savings accounts, virtual currency, credits, points, and/or any other redeemable value. Payment instruments may be represented with an icon 804 and/or a text description 806. The icon 804 may indicate a type, servicer, or provider of the payment instrument, such as Visa®, MasterCard®, PayPal®, Bank, and so forth. An update control 808 may enable updating the payment type using another UI described below. A "switch payments" control 810 may enable switching payments for sites, which may be facilitated using yet another UI described below. An "add payment" control 812 may facilitate adding a new payment instrument, which may be facilitated using still another UI described below.

Figure 9:
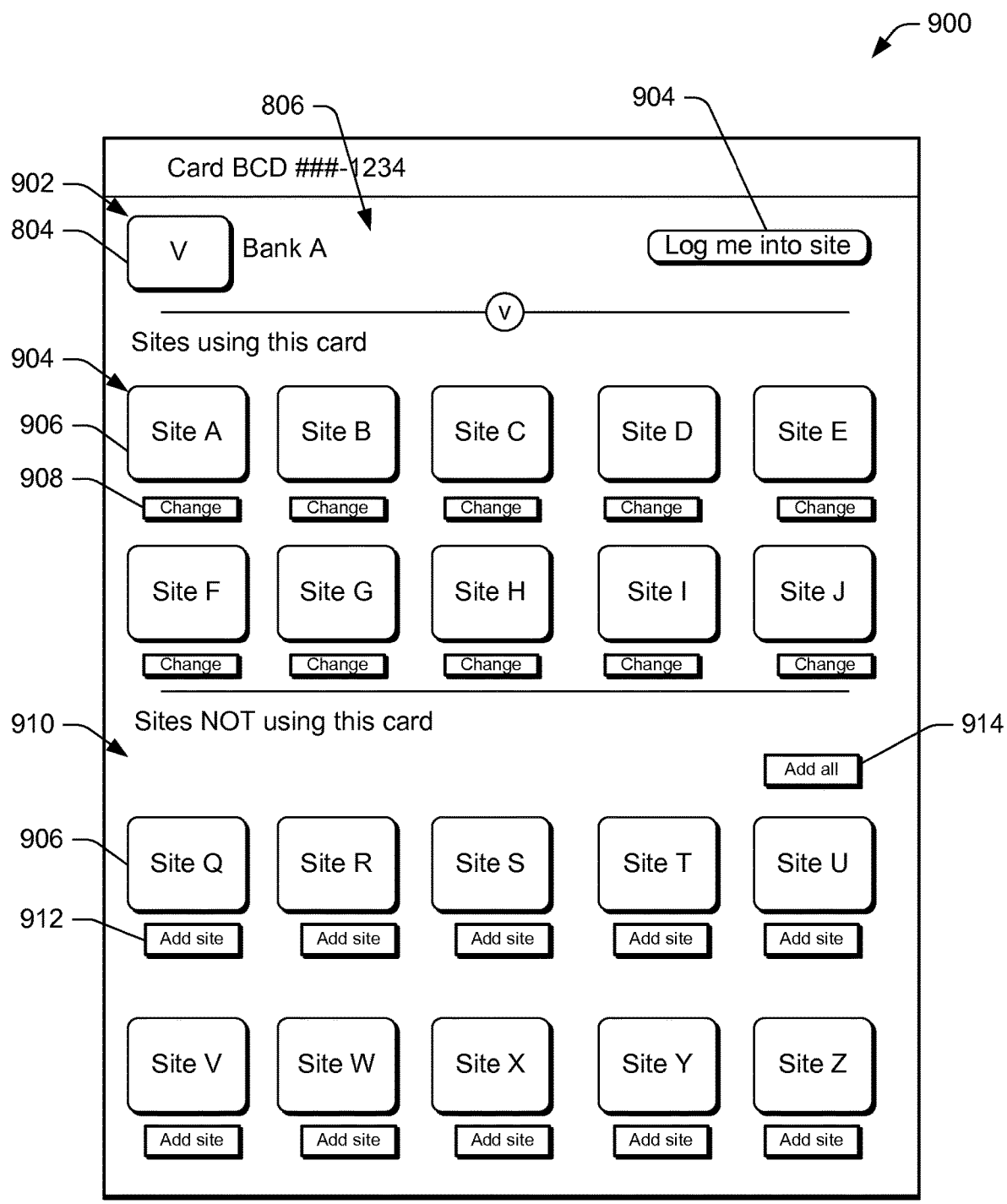
FIG. 9 shows an illustrative UI that includes a detail interface that shows remote storage of a payment instrument and enables adding additional sites for the payment instrument.

FIG. 9 shows an illustrative UI 900 that includes a detail interface that shows remote storage of a payment instrument and enables adding additional sites for the payment instrument. The UI 900 may include a payment instrument 902, which may be depicted with the icon 804 and the textual description 806. A login control 904 may cause a script, created by the script generator 124, to be executed to log the user device into a site associated with the payment instrument, such as a site of a provider or servicer of the payment instrument.

The UI 900 may include a listing of used sites 906 that use this payment instrument. In some embodiment, the used sites 906 may use this payment instrument as a default payment instrument which is selected by default when performing a transaction using one of these sites. By making the payment instrument a default payment instrument, the payment instrument is more likely to be used in a transaction involved with the site. This is desirable for bank, a servicer, or a provider of the payment instrument since it increases a likelihood that the payment instrument will be used. The current sites may be represented with a descriptor 908, which may enable access to information about the site or the site itself. In some embodiments, selection of the descriptor 908 may cause a script to be executed that logs the user into the site and access a location of the site that stores this payment instrument, such as a user account. A change control 910 may cause a script, created by the script generator 124, to be executed to change a payment instrument associated with a current site. The change control 910 may cause a script, created by the script generator 124, to be executed to enable other features and/or access to another UI to facilitate interaction with the site or payment instrument.

The UI 900 may include a listing of unused sites 912. The used sites 906 may not use this payment instrument or may not have this payment instrument selected as a default payment instrument which is selected by default when performing a transaction using one of these sites. A "add site" control 912 may cause a script, created by the script generator 124, to be executed to add the payment instrument 902 to unused site and/or make the payment instrument 902 a default payment instrument for the selected unused site. An "add all" control may cause one or more scripts to update all the unused sites 910.

Figure 10:
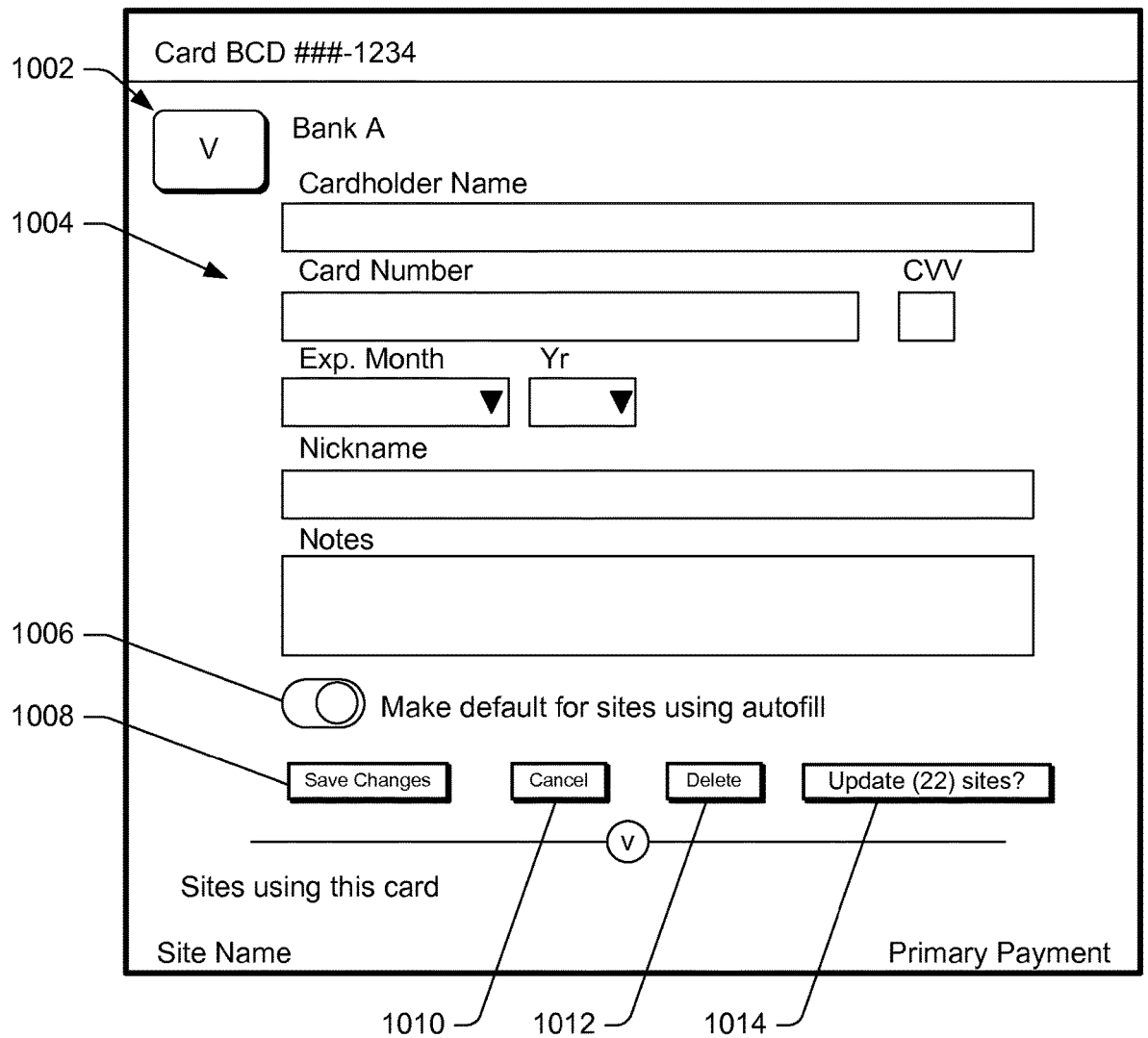
FIG. 10 shows an illustrative UI that includes a payment instrument input interface to enable updating a payment instrument locally and/or remotely.

FIG. 10 shows an illustrative UI 1000 that includes a payment instrument input interface to enable updating a payment instrument locally and/or remotely. The UI 1000 may provide details of a payment instrument 1002. The UI 1000 may enable update of information 1004 associated with the payment instrument, such as a name of a person associated with the payment instrument, a number or identifier, an expiration data, a nickname, notes, and/or other information. A "make default" control 1006 may make this payment instrument a default instrument during autofill operations, which may cause a script, created by the script generator 124, to be executed to populate input fields in sites using the information 1004 or similar information when applicable. The autofill may be performed by a script, created by the script generator 124, that is executed to update known and previously identified fields in a site with the corresponding information. The UI 1000 may include a "save changes" control 1008, which may save changes to the payment instrument in the user data 118 or in another location. The UI 1000 may include a cancel control 1010 to cancel an update to the payment instrument (or exit the UI 1000) and a delete control 1012 to delete or remove the payment instrument, possibly from the user data 118 or another location. An update control 1014 may cause changes received from information 1004 via the UI 1000 to be updated in sites that use this payment instrument. The update control 1014 may cause one or more scripts, created by the script generator 124, to be executed to update sites with the information 1004.

Figure 11:
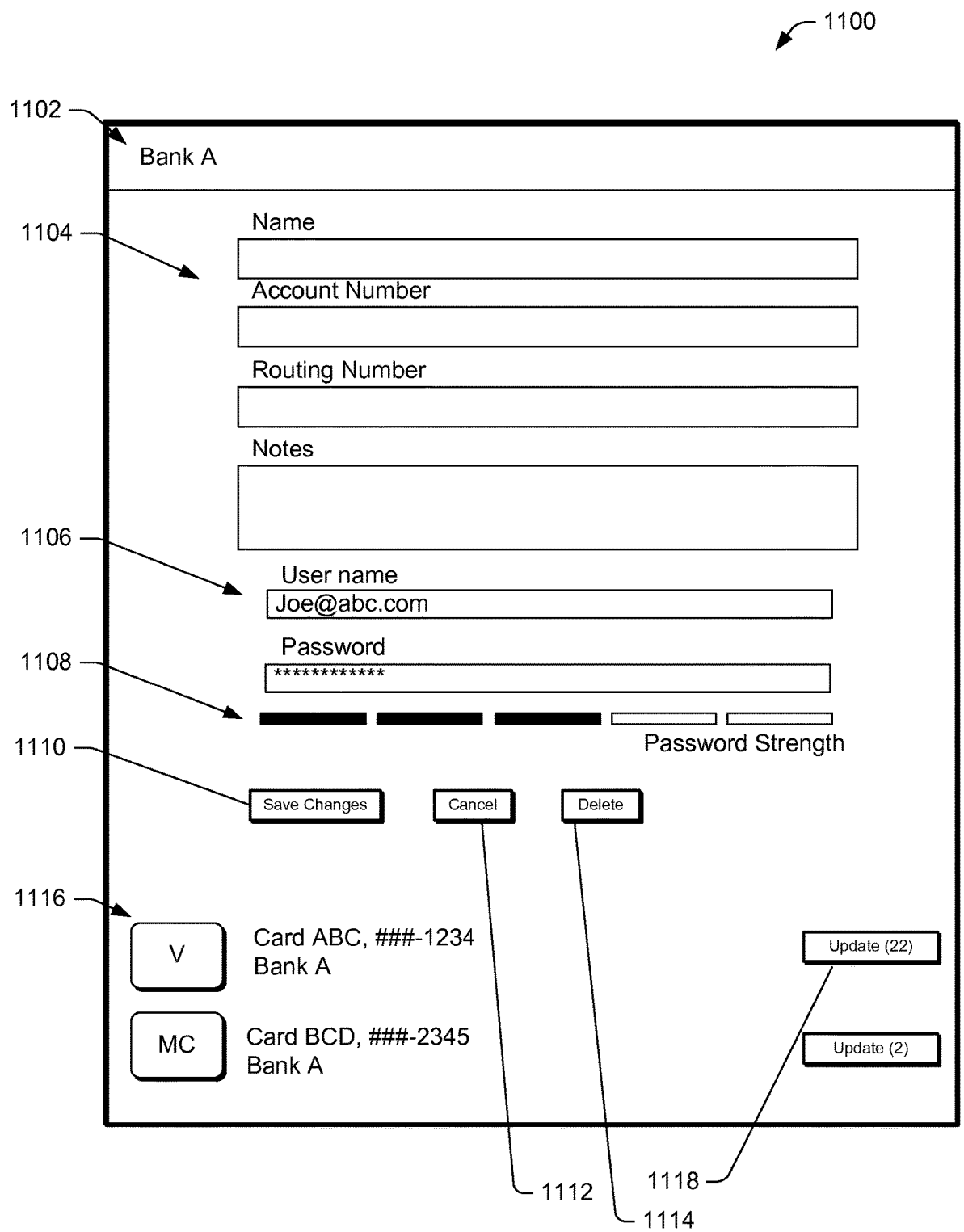
FIG. 11 shows an illustrative UI that includes another payment instrument input interface to enable updating a payment instrument locally and/or remotely.

FIG. 11 shows an illustrative UI 1100 that includes another payment instrument input interface to enable updating a payment instrument locally and/or remotely. The UI 1100 is associated with a payment entity 1102, such as a bank, provider, or service. The UI 1100 includes information 1104, which may be updated for the payment entity 1102, such as a name, an account number, a routing number, notes, and/or other relevant information depending on the type of payment entity (e.g., bank, corporate provider, payment servicer, etc.). The UI 1100 may include a credentials input section 1106 that enables input of credentials, such as a username and password. A credential strength meter 1108 may provide feedback about a strength of the credentials. A "save changes" control 1110 may enable saving changes to the payment entity in the user data 118 or in another location. The UI 1110 may include a cancel control 1112 to cancel an update to the payment entity (or exit the UI 1100) and a delete control 1114 to delete or remove the payment entity, possibly from the user data 118 or another location.

The UI 1100 may include a payment instrument section 116 that lists payment instruments associated with the payment entity. An update control 1118 may cause changes received from information 1104 via the UI 1100 to be updated in sites that use this payment instrument. The update control 1118 may cause one or more scripts, created by the script generator 124, to be executed to update sites with the information 1104.

FIG. 12 shows an illustrative UI 1200 that includes a site management interface to enable adding updating remote data associated with the site. The UI 1200 allows selection of a site, such as an electronic merchant, service provider, or other site. The UI 1200 includes a search control 1202 to search for a site. A site input field 1204 may enable selection of a site or input of a site. Once a site is identified, other options may become available, as discussed below with reference to the UI 1200. For example, payment instruments 1206 may be presented that may be associated with the selected site. Selection of one of these payment instruments may cause a script, generated by the script generator 124, to be executed to update the payment instrument and/or default payment instrument of the selected site.

The UI 1200 may include a credentials input section 1208 that enables input of credentials, such as a username and password. A credential strength meter 1210 may provide feedback about a strength of the credentials.

The UI 1200 may include an auto-credentials control 1212 that enable use of a script, generated by the script generator 124, to be executed to auto-input the credentials to the selected site when the site is visits by the user device operating the script module 228. A master-password control 1214 may cause a prompt to use a master password prior to inputting the credentials.

A "save changes" control 1216 may enable saving changes to the site in the user data 118 or in another location. The UI 1200 may include a cancel control 1218 to cancel an update to the site (or exit the UI 1200) and a delete control 1220 to delete or remove the payment entity, possibly from the user data 118 or another location.

Figure 13:
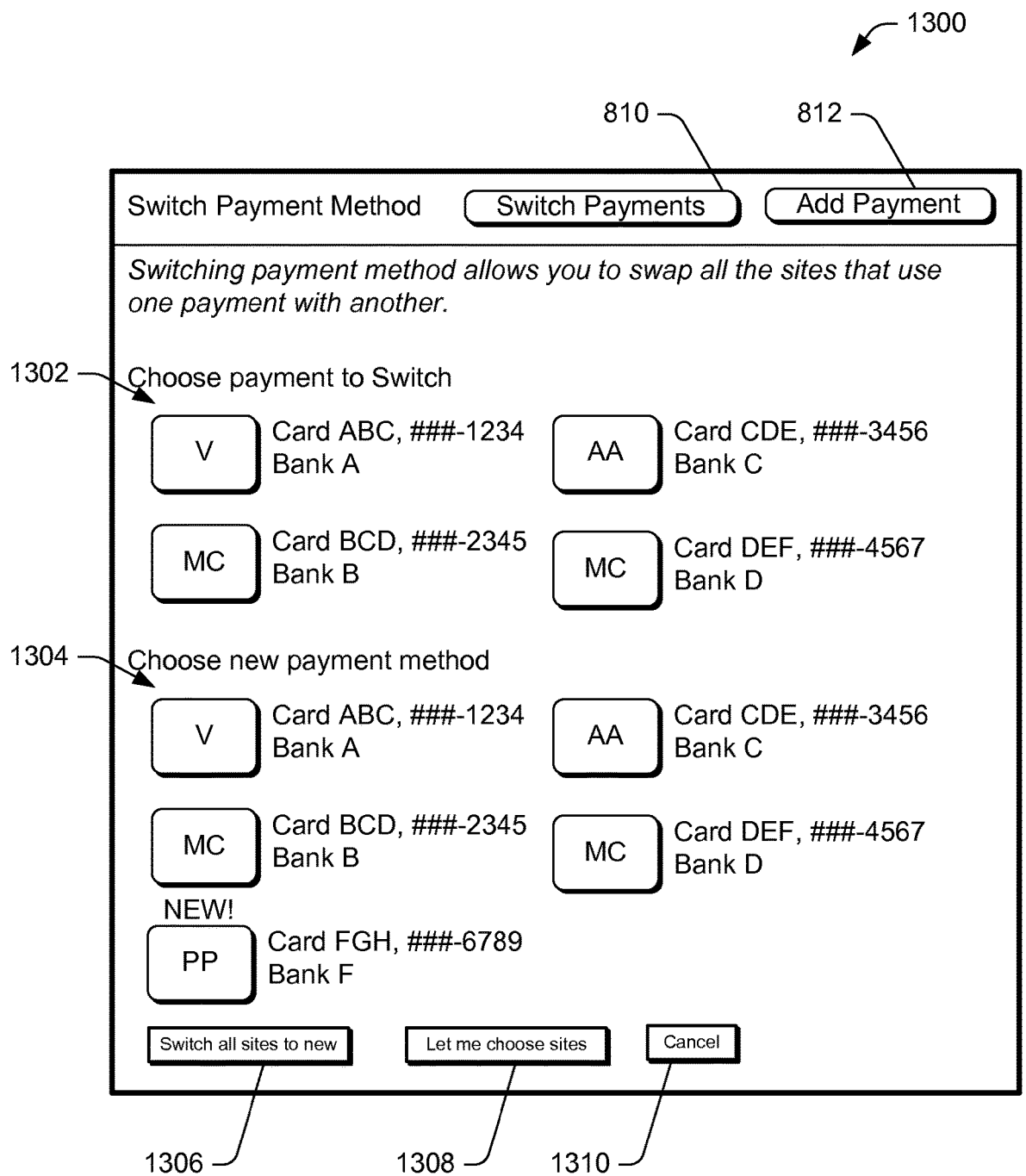
FIG. 13 shows an illustrative UI that includes a payment switching interface to enable switching payment instruments across one or more remote storage locations.

FIG. 13 shows an illustrative UI 1300 that includes a payment switching interface to enable switching payment instruments across one or more remote storage locations. The UI 1300 may include a first section 1302 that enables selection of a payment instrument to switch, update, or replace with a payment instrument selected from a second section 1304. The switch, update, or replacement may be performed via one or more scripts, generated by the script generator 124, and executed by the user device having the script module 228. A user may select a payment instrument from the first section 1302 and select a payment instrument from the second section 1304. The user may then select one of the following controls to cause further actions. A "switch all sites" control 1306 may cause all sites that use the selected payment instrument from the first selection to be replaced with the selected payment instrument from the second selection using one or more scripts executed by the script module 228. In some embodiments, the "switch all sites" control 1306 may cause all sites that use the selected payment instrument from the first selection as a default payment instrument to be replaced with the selected payment instrument from the second selection as a default payment instrument using one or more scripts executed by the script module 228. A "let me choose" control 1308 may enable selection of which sites to update using the selections in the UI 1300 or another UI. A cancel control 1310 may cancel any updates (or exit the UI 1300).

Figure 14:
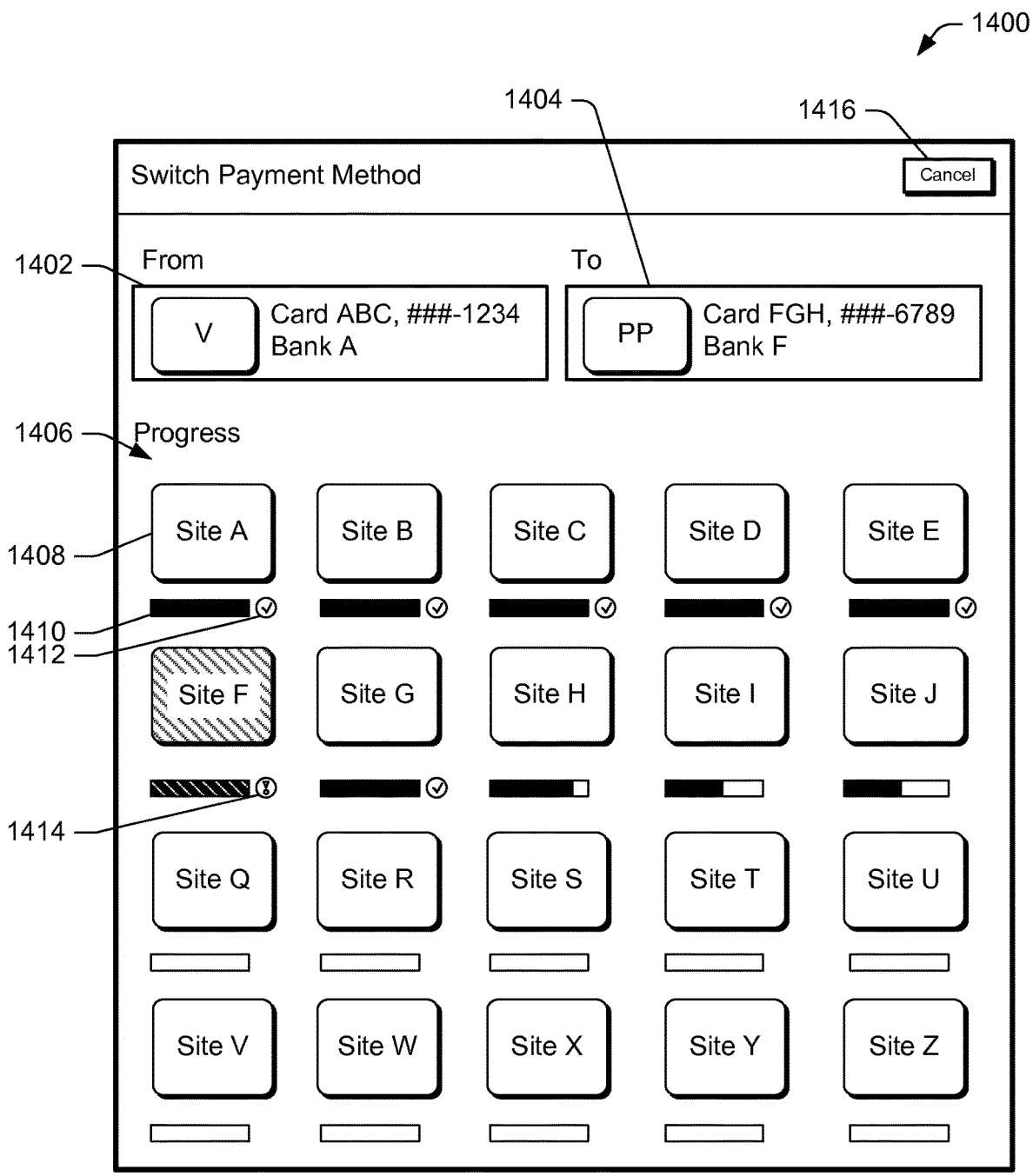
FIG. 14 shows an illustrative UI that includes a payment switching interface that reports progress of a switch of a payment instrument across one or more remote storage locations.

FIG. 14 shows an illustrative UI 1400 that includes a payment switching interface that reports progress of a switch of a payment instrument across one or more remote storage locations. The UI 1400 may be accessed in response to use of the UI 1300. The UI 1400 includes a prior payment instrument 1402 that is to be updated, replaced, or switched with a replacement payment instrument 1404. For example, the prior payment instrument 1402 may be a selection from the first section 1302 from the UI 1300 while the replacement payment instrument 1404 may be a selection from the second section 1304 from the UI 1300.

A progress section 1406 may indicate progress of updates to sites to replace, update, or switch the payment instruments, where the update is caused by one or more scripts, generated by the script generator 124, and executed by the user device via the script module 228. The progress section 1406 may include a site identifier 1408, a progress indicator 1410, and a completion indicator 1412. The progress indicator may provide information about a progress of an update, such as by using a bar or meter that graphically depicts progress of the update. The completion indicator 1412 may indicate a successful completion, which may then be communicated to the event logger 208. An error indicator 1414 may indicate an error has occurred, which may be communicated to the event logger 208 and processed as described above in the processes 600 and 620. For example the error indicator 1414 may enable a user to retry the script or the script may be automatically retried at a later time. A cancel control 1416 may cancel any updates (or exit the UI 1400).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed by the one or more processors causes the one or more processors to perform acts comprising:
analyzing an electronic site by:
sending, via a network, a request to the electronic site for page data, the request including first credentials;
receiving, via the network, the page data in response to the request;
inspecting the page data; and
determining, based on the inspecting of the page data, site data for the electronic site, the site data including:
one or more input fields; and
one or more functions of the one or more input fields;
storing the site data in a site directory;
generating a script based at least in part on the site data stored in the site directory;
executing the script on a test device;
validating that the executing script is updated with user data from the test device, and that the test device executing the script interacts with the electronic site by:
inputting second credentials;
accessing the one or more input fields by navigating the electronic site;
inputting sample user information via the one or more input fields; and
submitting the sample user information; and
transmitting the validated script to a user device.

2. The one or more non-transitory computer-readable media as recited in claim 1, wherein at least one of the one or more the input fields is associated with input of the second credentials.

3. The one or more non-transitory computer-readable media as recited in claim 1, wherein at least one of the one or more input fields is associated with at least one of input or update of a payment instrument.

4. The one or more non-transitory computer-readable media as recited in claim 1, the acts further comprising receiving event data from the user device, the event data associated with at least one of an error in execution of the script or input of additional user information using the script.

5. A method comprising:
analyzing, by one or more processors, an electronic site by:
sending, via a network, a request to the electronic site for page data, the request including first credentials;
receiving, via the network, the page data in response to the request;
inspecting the page data; and
determining, based on the inspecting of the page data, site data for the electronic site, the site data including:
one or more input fields; and
one or more functions of the one or more input fields;
storing the site data in a site directory;
generating a script based at least in part on the site data stored in the site directory;
executing the script on a test device;
validating that the executing script, is updated with user data from the test device, and that the test device executing the script interacts with the electronic site by:
inputting second credentials;
accessing the one or more input fields by navigating the electronic site;
inputting sample user information via the one or more input fields; and
submitting the sample user information; and
transmitting the validated script to a user device.

6. The method as recited in claim 5, wherein at least one of the one or more input fields is associated with input of the second credentials.

7. The method as recited in claim 5, wherein at least one of the one or more input fields is associated with at least one of input or update of a payment instrument stored by the electronic site.

8. The method as recited in claim 5, further comprising receiving, by the one or more processors, event data from the user device, the event data associated with at least one of an error in execution of the script or input of additional user information using the script.

9. The method as recited in claim 5, wherein the one or more input fields includes at least a payment information field and the one or more functions includes at least receiving a payment.

10. A system comprising:
one or more processors; and
memory storing computer-executable instructions that, when executed by the one or more processors causes the one or more processors to perform acts comprising:
analyzing an electronic site by:
sending, via a network, a request to the electronic site for page data, the request including first credentials;
receiving, via the network, the page data in response to the request;
inspecting the page data; and
determining, based on the inspecting of the page data, site data for the electronic site, the site data including:
one or more input fields; and
one or more functions of the one or more input fields;
storing the site data in a site directory;
generating a script based at least in part on the site data stored in the site directory;
executing the script on a test device;

validating that the executing script is updated with user data from the test device, and that the test device executing the script interacts with the electronic site by:
inputting second credentials;
accessing the one or more input fields by navigating the electronic site;
inputting sample user information via the one or more input fields; and
submitting the sample user information; and
transmitting the validated script to a user device.

11. The system as recited in claim 10, wherein at least one of the one or more the input fields is associated with input of the second credentials.

12. The system as recited in claim 10, wherein at least one of the one or more input fields is associated with at least one of input or update of a payment instrument.

13. The system as recited in claim 10, the acts further comprising receiving event data from the user device, the event data associated with at least one of an error in execution of the script or input of additional user information using the script.

14. The system as recited in claim 10, wherein the one or more input fields includes at least a payment information field and the one or more functions includes at least receiving a payment.

15. The one or more non-transitory computer-readable media as recited in claim 1, wherein the one or more input fields includes at least a payment information field and the one or more functions includes at least receiving a payment.

* * * * *